United States Patent
Hinchley et al.

(10) Patent No.: US 6,490,250 B1
(45) Date of Patent: Dec. 3, 2002

(54) ELEMENTARY STREAM MULTIPLEXER

(75) Inventors: Ronald E. Hinchley, San Jose; Govind Kizhepat, Sunnyvale; Phillip Lowe, Saratoga, all of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/265,486

(22) Filed: Mar. 9, 1999

(51) Int. Cl.[7] ............................. H04J 3/14; H04L 12/26
(52) U.S. Cl. ..................... 370/232; 370/235; 370/465
(58) Field of Search ................... 370/230, 231, 370/232, 233, 234, 235, 506, 537, 538, 545, 465; 725/148, 149; 709/231, 233, 234

(56) References Cited

U.S. PATENT DOCUMENTS

| | | | | |
|---|---|---|---|---|
| 5,231,492 A | * | 7/1993 | Dangi et al. ............... | 348/14.1 |
| 5,457,495 A | | 10/1995 | Hartung ...................... | 348/414 |
| 5,627,581 A | * | 5/1997 | Kondo ...................... | 348/14.13 |
| 5,686,964 A | * | 11/1997 | Tabatabai et al. ....... | 375/240.01 |
| 5,708,664 A | * | 1/1998 | Budge et al. ............... | 370/465 |
| 6,157,674 A | * | 12/2000 | Oda et al. ................... | 370/503 |
| 6,167,084 A | * | 12/2000 | Wang et al. ........... | 375/240.02 |
| 6,181,711 B1 | * | 1/2001 | Zhang et al. ............... | 370/468 |
| 6,188,700 B1 | * | 2/2001 | Kato et al. .................. | 370/468 |
| 6,219,358 B1 | * | 4/2001 | Pinder et al. ............ | 348/423.1 |
| 6,233,226 B1 | * | 5/2001 | Gringeri et al. ............. | 348/700 |
| 6,240,103 B1 | * | 5/2001 | Schoenblum et al. .... | 348/423.1 |
| 6,259,733 B1 | * | 7/2001 | Kaye et al. ................. | 375/240 |
| 6,269,078 B1 | * | 7/2001 | Lakshman et al. .......... | 370/230 |
| 6,285,689 B1 | * | 9/2001 | Negishi et al. ............. | 348/515 |
| 6,301,248 B1 | * | 10/2001 | Jung et al. .................. | 370/392 |
| 6,310,857 B1 | * | 10/2001 | Duffield et al. ............. | 370/232 |
| 6,310,898 B1 | * | 10/2001 | Schwartz ................. | 348/423.1 |
| 6,327,275 B1 | * | 12/2001 | Gardner et al. .......... | 348/385.1 |

FOREIGN PATENT DOCUMENTS

| | | |
|---|---|---|
| EP | 0 676 899 A2 | 3/1995 |
| EP | 0 719 054 A2 | 6/1996 |

* cited by examiner

Primary Examiner—Hassan Kizou
Assistant Examiner—David Odland
(74) Attorney, Agent, or Firm—Thomas, Kayden, Horstemeyer & Risley, LLP

(57) ABSTRACT

An integrated multimedia encoding system is disclosed. Multimedia encoders which are capable of adjusting bit rates receive multimedia data to compress the data. After compressing the data, the multimedia encoders adjust the bit rates of the elementary streams responsive to a control input. Bit rates are increased or decreased using delays or, for video data, by allocating more or less bits to each macroblock, frame or group of frames. A unified memory module is coupled to the multimedia encoders to store the multimedia elementary stream data, the Program or Transport stream data, and data from other sources as needed. The unified memory is capable of adjusting storage allocations responsive to the realtime requirements of the incoming multimedia streams and the outgoing Program or Transport stream data. A stream processor is coupled to the unified memory module and the multimedia encoders for multiplexing the elementary streams into a single stream, and monitoring the actual bit rate of the combined multimedia stream. Monitoring the actual bit rate as a function of number of bits passed over a period of time provides accurate feedback as to the system throughput. A multimedia processor then determines the bit rates of the elementary streams, and generating a control signal to adjust the bit rates of the encoder to ensure that an optimal bit rate is continuously achieved by the system. The stream processor also operates using dedicated instructions which allow the stream processor to efficiently multiplex the incoming streams together.

14 Claims, 11 Drawing Sheets

ELEMENTARY STREAM MULTIPLEXER

FIELD OF THE INVENTION

The application relates generally to multimedia encoders and specifically an integrated multimedia stream multiplexer.

BACKGROUND OF THE INVENTION

Multimedia encoders, such as those used for MPEG and MPEG2 encoding, provide the necessary compression to allow video and audio data to be transferred, stored, and played in a computer environment. Conventional MPEG encoders typically use two encoders, video and audio, which receive data transmitted from a data source. Each encoder is coupled to a separate memory for storing the video and audio data. The video encoder compresses the video data and transmits the compressed data to the conventional stream multiplexer controller. The audio encoder performs the same tasks and transmits the compressed audio data to the stream multiplexer controller. In an MPEG2 environment, the two elementary streams are multiplexed by the stream multiplexer controller to generate either a Program or Transport stream, depending on the embodiment. The Program or Transport stream are stored in a separate PS/TS memory, or are fed directly to another device, such as a communications link. In this conventional system, the stream multiplexer operates independently of the video and audio encoders, and therefore the output bit rate of the Program or Transport stream is unpredictable, as it will vary as the bit rates of the elementary streams vary. The unpredictable bit rate of the output stream makes it more difficult to process the Program or Transport stream downstream. Additionally, in conventional systems when the bit rate of one stream decreases, the bit rate of the Program or Transport stream may decrease correspondingly, thus lowering the system throughput unnecessarily. The use of independent memory for each encoder also leads to underutilization of system resources. When the bit rate of a stream decreases, less data is stored in the corresponding memory by the corresponding encoder. However, in conventional systems, the newly available storage space remains unused until the bit rate for the stream increases. Finally, conventional stream processors process incoming elementary streams using a predetermined ratio-based approach which restricts the granularity of the multiplexing as the ratios are fixed and cannot be optimized for the requirements of different output streams.

Therefore, an integrated multimedia encoding system which is capable of generating a program or transport stream at a bit rate at or near the maximum bit rate capacity for the system is needed. Additionally, an integrated multimedia encoding system which operates with reduced memory storage requirements is also needed. Finally, a programmable elementary stream multiplexer is needed which takes advantage of dedicated instructions to perform the task of generating a single output data stream, and which is flexible to adjust the data rate for different formats.

SUMMARY OF THE INVENTION

In accordance with the present invention, an integrated multimedia encoding system is disclosed. Multimedia encoders which are capable of adjusting bit rates receive multimedia data to compress the data. After compressing the data, the multimedia encoders adjust the bit rates of the elementary streams responsive to a control input. Bit rates may be increased or decreased using delays, and generating more or less bits for each macroblock, frame or group of frames, or by increasing or decreasing the rate at which multimedia data is transmitted to the encoders. A unified memory module is coupled to the multimedia encoders to store the multimedia elementary stream data, the Program or Transport stream data, and data from other sources as needed. The unified memory is capable of adjusting storage allocations responsive to the realtime requirements of the incoming multimedia streams and the outgoing Program or Transport stream data. A stream processor is coupled to the unified memory module and the multimedia encoders for multiplexing the elementary streams into a single stream, and monitoring the actual bit rate of the combined multimedia stream. Monitoring the actual bit rate as a function of number of bits passed over a period of time provides accurate feedback as to the system throughput. A multimedia processor then determines the bit rates of the elementary streams, and generating a control signal to adjust the bit rates of the encoder to ensure that an optimal bit rate is continuously achieved by the system. The stream processor also operates using dedicated instructions which allow the stream processor to efficiently multiplex the incoming streams together.

DETAILED DESCRIPTION OF THE PREFERRED EMBODIMENTS

Figure 1:
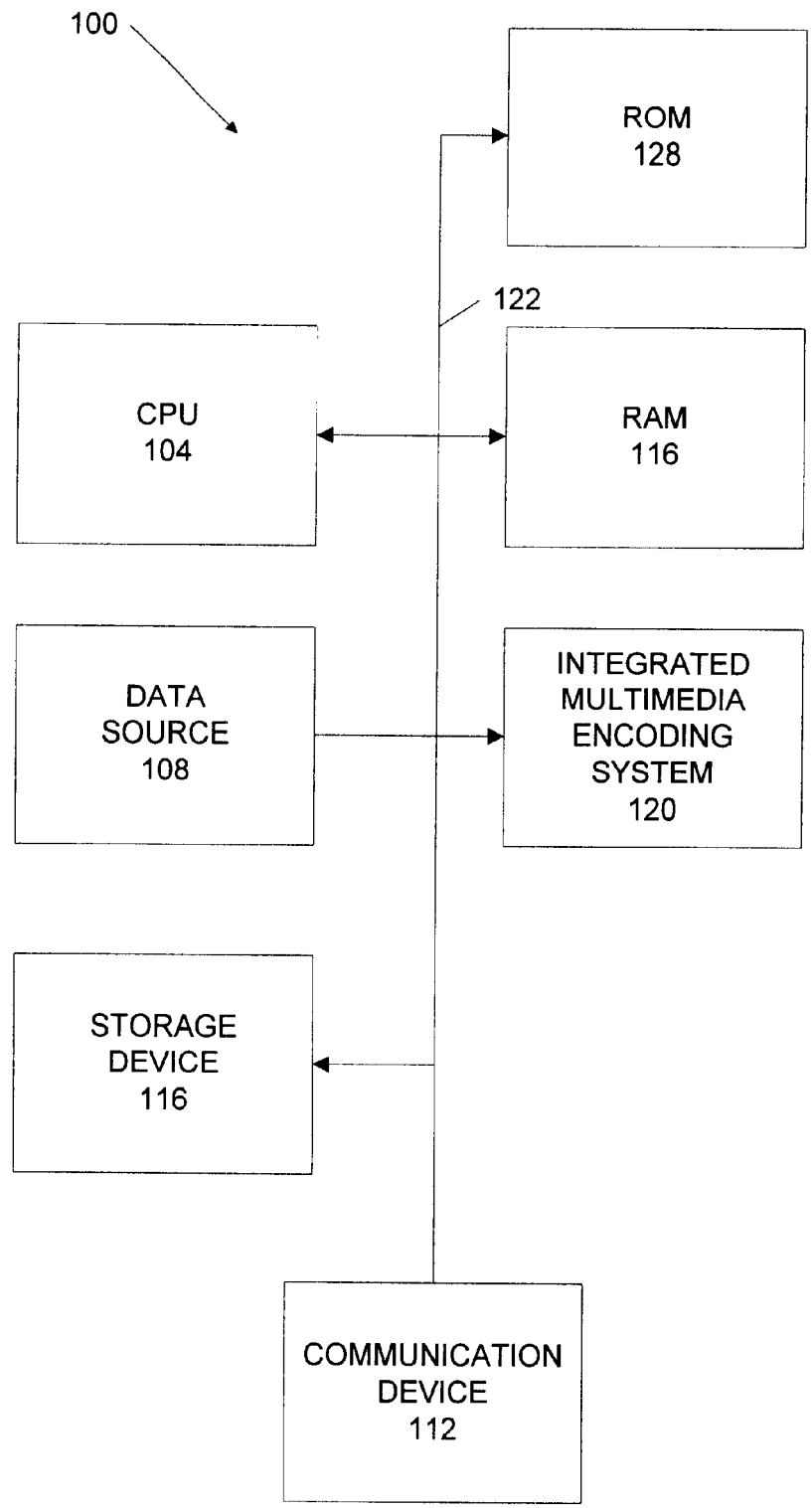
FIG. 1 illustrates an integrated multimedia encoding system in accordance with the present invention as a part of a computer system.

FIG. 1 illustrates a computer system 100 having an integrated multimedia encoding system 120 to perform video, audio, and other encoding tasks. In the MPEG or MPEG2 formats, video and audio data is encoded by a multimedia encoder and multiplexed to generate a program or transport stream. The program or transport stream is then transmitted to a remote device which decodes the data to enable a user to see or hear the information content. The computer system 100 has a central processing unit 104, which may execute specific programs related to multimedia processing, or may only perform other unrelated functions in an embodiment where the integrated multimedia encoding system 120 has a separate Digital Signal Processing (DSP) core. The CPU 104 is coupled to random access memory 116 and read only memory 128 on bus 122. However, other computer architectures may be used in accordance with the present invention. A data source 108, such as a CD-ROM, DVD-ROM, remote site, or a live source of multimedia data is coupled to the computer system 100 through bus 122. The output of the integrated multimedia encoding system 120 is transmitted to a communications device 112 for transporting the encoded and multiplexed data or a storage medium 116 for storage of the program or transport stream data, or a decoder for decoding the data for playback. The system 100 may be implemented as a personal computer, or as an integrated part of a consumer electronics device, such as a video recorder or camera.

Figure 2:
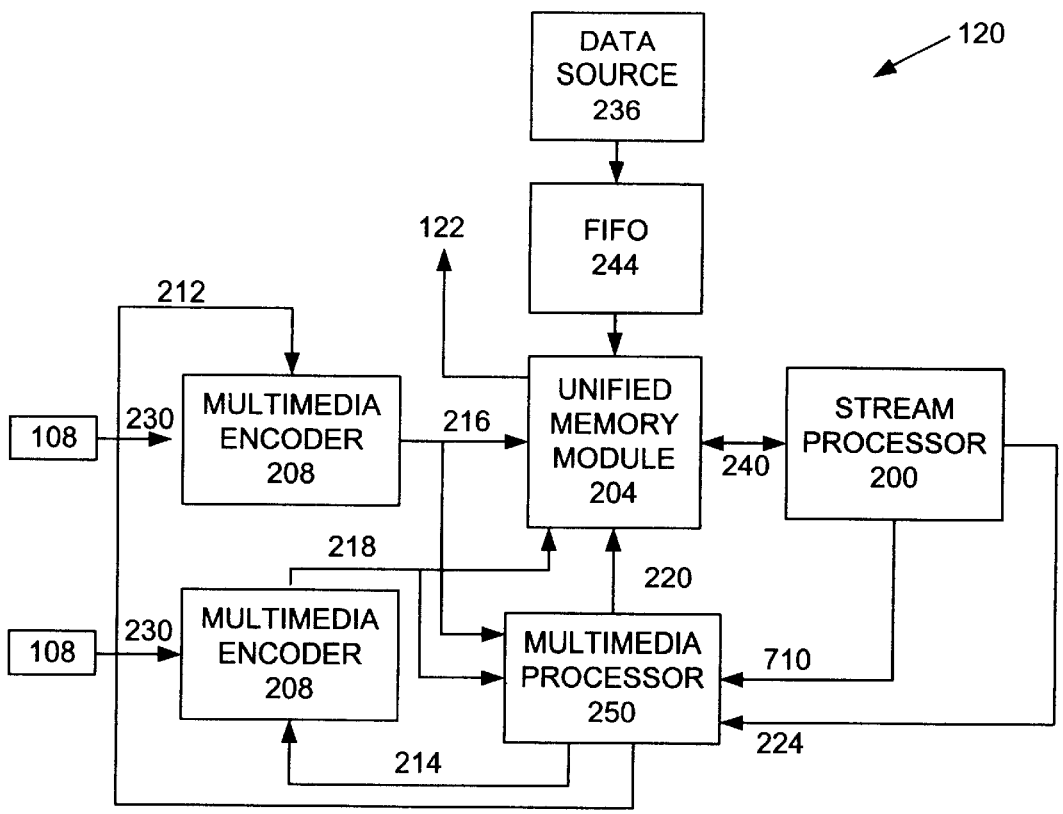
FIG. 2 is a more detailed block diagram of an embodiment of the integrated multimedia encoding system of the present invention.

FIG. 2 illustrates the integrated multimedia encoding system 120 in more detail. Preferably, the present invention is implemented as a single-chip integrated multimedia encoding system 120; however, the various components illustrated may also be implemented separately. Multimedia data 230 is transmitted to the integrated multimedia encoding system 120 from a data source 108 within computer system 100 or external to computer system 100. The multimedia encoders 208 receive the data 230 and compress the data 230 responsive to the compression format being used in the computer system 100, such as the MPEG2 compression standard. The encoders 208 perform conventional compression techniques to create macroblocks (4:2:0, 4:2:2, or 4:4:4 macroblocks in MPEG 2) from blocks of video data, and create the appropriate inter-picture coding required to compress the video data for transmission. Each individual block of video data is processed by the discrete cosine transform to obtain frequency coefficients, and the resulting block of frequency coefficients is quantized. Conventional techniques such as zig-zag scanning and run length coding may be performed by the encoders 208 to convert the quantized frequency coefficients into run-amplitude pairs. After compressing the data 230 and generating elementary multimedia streams, the encoders 208 adjust the data rate of the elementary multimedia streams responsive to a data rate feedback signal 212, 214. The adjusted elementary multimedia streams 216, 218, are transmitted to the unified memory module 204 and multimedia processor 250.

The unified memory module 204 receives the adjusted elementary streams 216, 218, the output combined data 224 as well as data streams from other data sources 236, such as from the PCI bus, through a conventional FIFO 244. If the other data sources 236 are not designed to be able to adjust output data rates responsive to data rate feedback signals 212, 214, their data rates are still used in order to determine optimal rates for the encoders 208 to achieve an overall optimal data rate for the system 120 and their storage requirements are dynamically allocated within the unified memory module 204. Preferably there are at least two data sources 236 whose data rates are adjustable. The unified memory module 204 dynamically allocates blocks of memory to each stream responsive to memory allocation signal 220, generated by multimedia processor 250. Multimedia processor 250 is preferably a Digital Signal Processing (DSP) core which is designed to perform conventional multimedia operations as well as the specialized functions in accordance with the present invention. The adjusted elementary multimedia streams 216, 218 are also transmitted to the multimedia processor 250, which monitors the data rates of the adjusted elementary multimedia streams 216, 218 to generate the data rate feedback signals 212, 214. The stream processor 200 monitors the actual data rate of the combined multimedia stream 224 and transmits this data to the multimedia engine 250. Finally, the stream processor 200 retrieves data on data line 240 from the unified memory module 204 and processes the data in accordance with a linked list of commands comprising dedicated instructions for multiplexing the data into a single output stream 224. The combined stream data 224 is stored back into the unified memory module 204. Bus 122 is used to access the combined stream data 224 for transmission to other components of the system 100.

Figure 3:
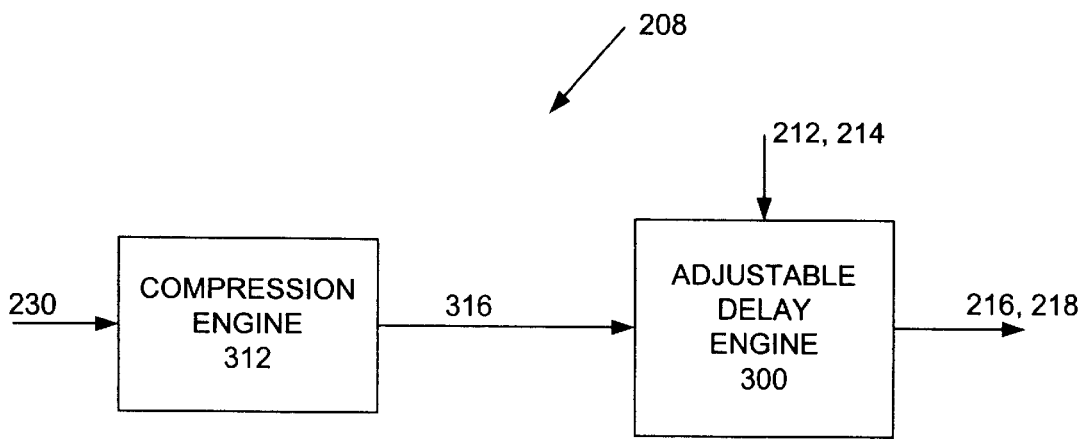
FIG. 3 is a more detailed block diagram of a multimedia encoder in accordance with the present invention.

FIG. 3 is a more detailed block diagram of one embodiment of the multimedia encoder 208 in accordance with the present invention. Compression engine 312 encodes incoming video frames 230 into a video elementary stream or audio samples 230 into an audio elementary stream. The output compressed elementary multimedia stream 316 is transmitted to an adjustable delay engine 300. The adjustable delay engine 300 adjusts the data rate of the compressed elementary multimedia stream 316 responsive to the data rate feedback signal 212, 214 received from the multimedia processor 250. The adjusted elementary multimedia streams 216, 218 are transmitted to the unified memory module 204.

Figure 4:
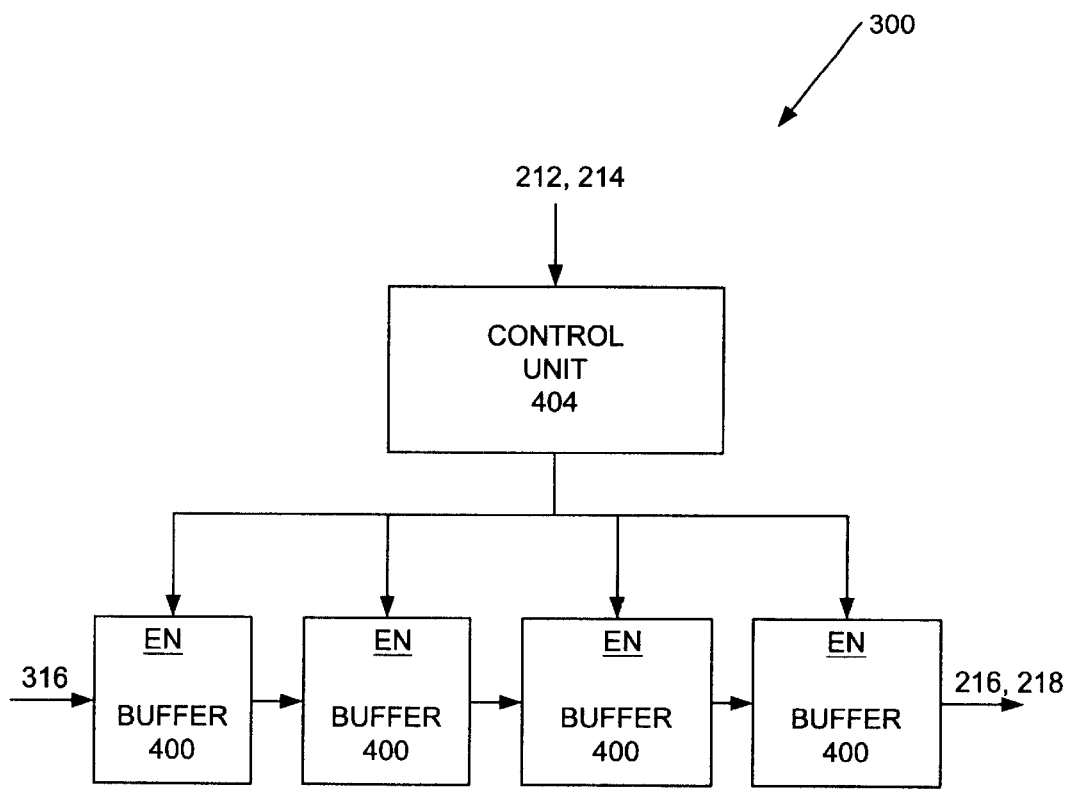
FIG. 4 is a more detailed block diagram of an adjustable delay engine in accordance with the present invention.

FIG. 4 is a block diagram illustrating in more detail one embodiment of the adjustable delay engine 300. The data rate feedback signals 212, 214 are transmitted to a control unit 404 which controls the data rate of the compressed multimedia stream 316. If the data rate must decrease, the control unit 404 enables the corresponding number of delay buffers 400 to produce a data rate which matches the target rate 212, 214. If the data rate of the compressed multimedia stream 316 must increase, delay buffers 400 which are currently enabled are disabled to increase the data rate of the elementary stream 316. If the target data rate 212, 214 and the analyzed data rate are equal, then the control unit 404 performs no operation, and the current data rate is maintained. In an alternate embodiment, the number of bits allocated for each macroblock, frame, or group of frames is adjusted by the control unit 404 in order to increase or decrease the data rate of the stream 316 described in more detail below. In a further embodiment, a conventional encoder is used as encoder 208, and the multimedia engine 250 adjusts the data rate output of the encoder 208 by adjusting the rate of the data which is input to the encoder 208, responsive to its analysis of the difference between the system data rate and the target data rate, also described in more detail below.

Figure 5:
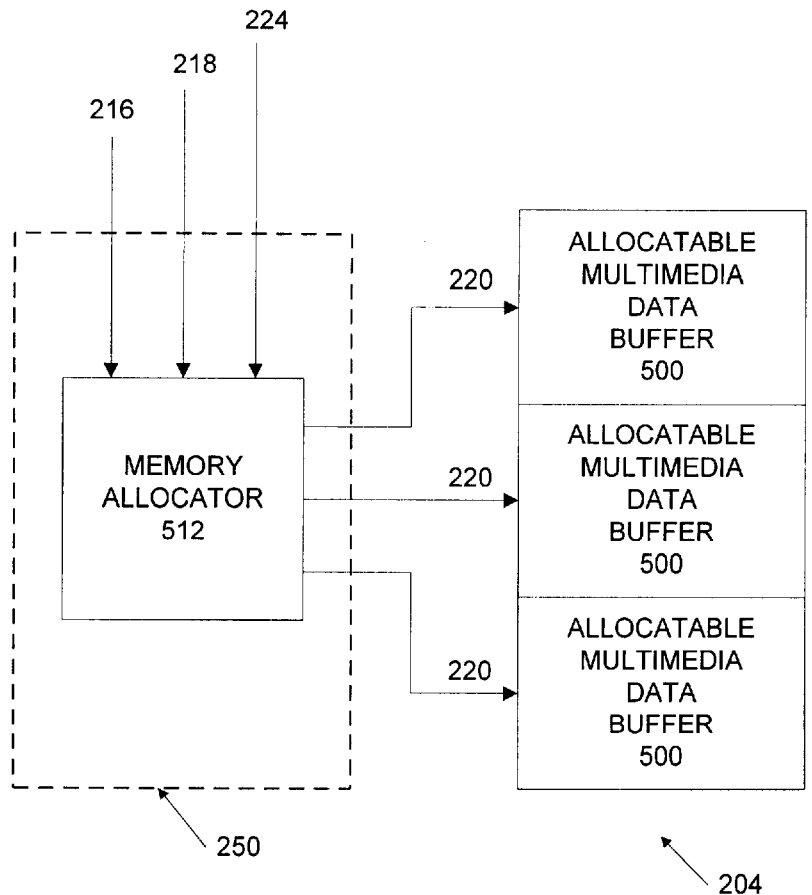
FIG. 5 is a more detailed block diagram of an embodiment of a memory allocator and unified memory module in accordance with the present invention.

FIG. 5 illustrates a more detailed block diagram of an embodiment of a memory allocator 512 and unified memory module 204 in accordance with the present invention. Memory allocator 512 is part of the multimedia processor 250; however, an independent processor may also be used to provide the allocation functions. Memory allocator 512 receives the adjusted elementary multimedia streams 216, 218 and the combined multimedia stream 224. Memory allocator 512 determines the storage requirements of each stream, and allocates data buffers 500 correspondingly across lines 220.

Figure 6:
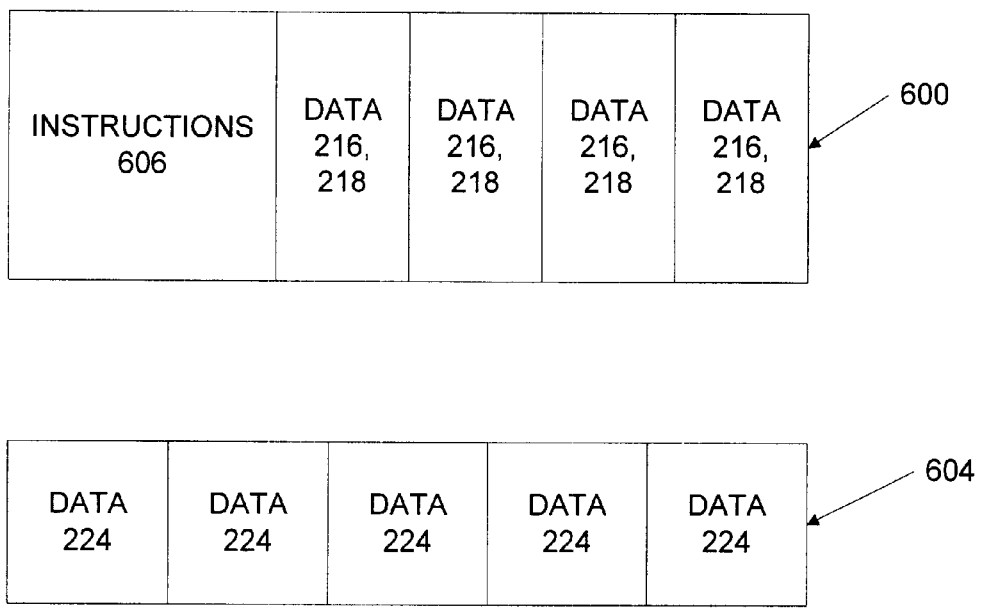
FIG. 6 is a block diagram of an embodiment of allocatable memory buffers in accordance with the present invention.

As shown in FIG. 6, the buffers 500 store compressed multimedia data 216, 218 and output combined data 224. When a buffer 600 stores compressed multimedia data 216, 218 it stores instructions 606 for processing the data 216, 218 and the data itself 216, 218. When a buffer 604 stores output combined data 224, and only the data 224 itself are stored. The storage buffers 500 are built as a linked list of buffers which are processed sequentially by the stream processor 200. When the multimedia processor 250 determines the proper allocation of buffers 500 to accommodate the different streams, the multimedia processor 250 modifies the linked list accordingly. After every frame is generated, the memory allocator 512 determines how may bits were generated for the frame. Then, a buffer 600 is allocated for to store the information. The buffers 600 are sequentially ordered, and once a first buffer 600 is filled, a second buffer 600 is allocated to store the next frame. Once all of the buffers 600 have been filled, the memory allocator 512 rotates back to the first buffer 600 to allocate the next frame of data. As the stream processor processes the buffers 600 in sequence, by the time the memory allocator 512 rotates back to the first buffer 600, the stream processor will be finished processing the information in that buffer 600. The allocator 512 is therefore able to dynamically allocate buffers 600 of different sizes to store incoming frames of different sizes, thus optimizing the use of the memory module 204 and increasing the overall efficiency of the system.

The instructions 606 for processing the adjusted elementary multimedia streams 216, 218 are preferably dedicated instructions written into the buffers 600 for the stream processor 200 to access and execute. The instructions 606 are written into the buffers 600 by the multimedia processor 250. Using dedicated instructions allows the programmer to easily manipulate the data with confidence that the intended operations are performed accurately. Also, dedicated instructions 606 are more efficient as they are tailored to the precise operations required in stream multiplexing. In an exemplary embodiment, the instructions 606 include program control instructions, data access instructions, and data processing instructions. Program control instructions include NOP, STOP, JUMP, INTERRUPT. Data access instructions include READ and WRITE instructions for reading and writing data to and from memory 204. The data processing instructions are specific for the data manipulations required to multiplex the adjusted elementary multimedia streams 216, 218 and generate the combined multimedia stream 224. These include START_STOP_CRC, which is used to delimit data included in a checksum calculation, INSERT_CRC, which inserts the computed CRC into the data stream at the current position, INSERT_TIME_STAMP, which causes the current time stamp to be inserted at the current position, STUFF, which inserts a programmable number of bits into the combined multimedia stream 224, and ENCRYPT, which performs encryption on the associated data, according to the DVD or DVB encryption requirements.

The use of dedicated instructions 606 with a programmable stream processor 200 allows the system 120 to provide a high level of granularity in performing its multiplexing operation. The multimedia processor 250 is capable of determining whether a stream is an elementary stream, program stream, or transport stream, all of which must be formatted differently, and is capable of determining the byte size used in a current stream. The multimedia processor 250 is then able to tailor the instructions 606 to adjust the multiplexing of the programmable stream processor 200 and also adjust the data rates of the stream to optimally process the data responsive to the format required. In conventional systems in which the multiplexing operation is hard-wired to an unresponsive CPU, the multiplexing operation was not able to adjust for different formats. Rather, one ratio must be used to accommodate all formats, and no control over the byte sizes of the data is provided. A predetermined ratio, because of its general applicability, is not optimal for processing streams which may be of multiple formats, and cannot be tailored to meet the real time requirements of the system. In contrast, the programmable stream processor 200 in accordance with the present invention is able to process the data at a fine level of granularity in accordance with the intended format of the stream and the current system requirements.

Figure 7:
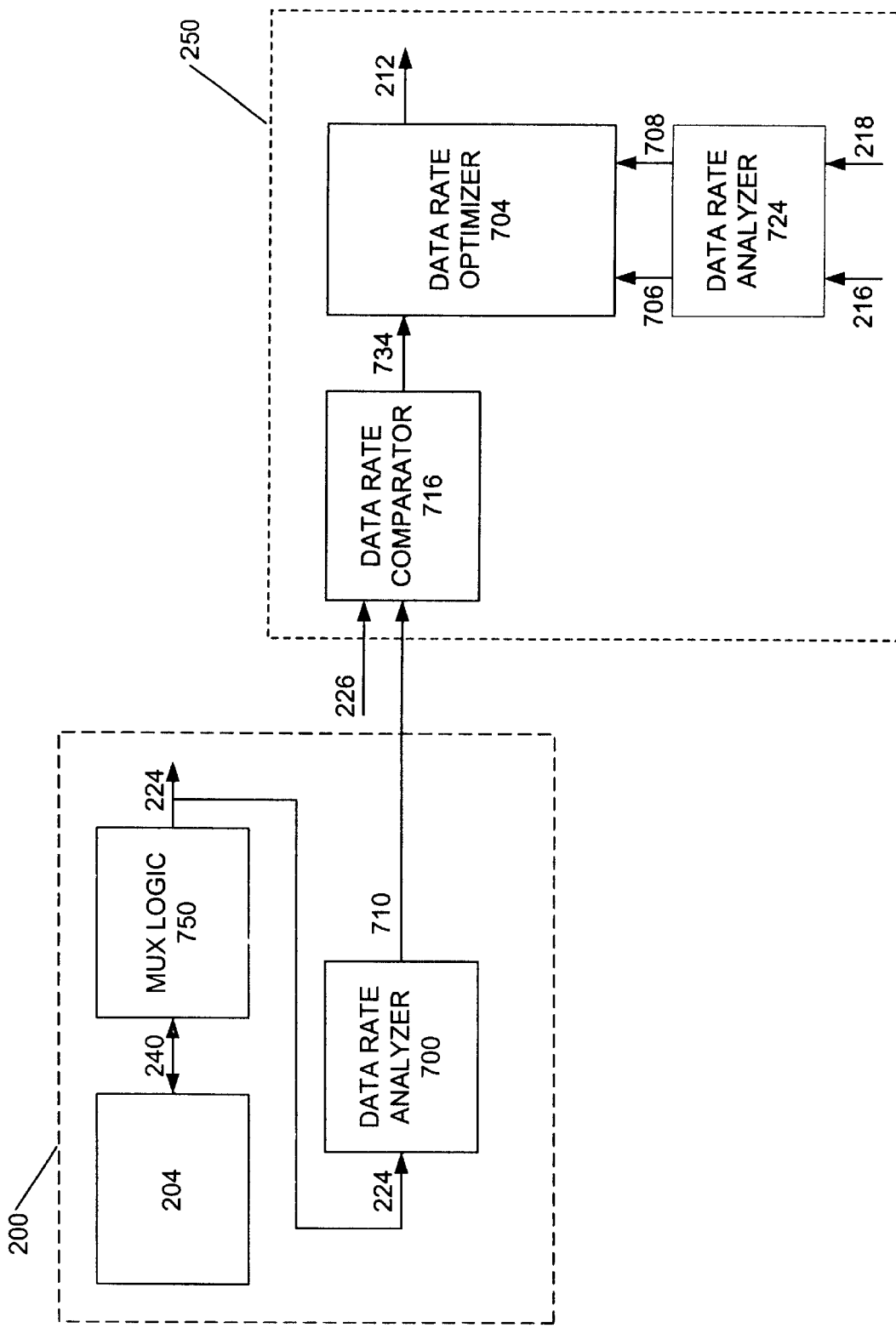
FIG. 7 is a more detailed block diagram of an embodiment of a stream processor and multimedia processor in accordance with the present invention.

FIG. 7 is a more detailed block diagram of an embodiment of the stream processor 200 and multimedia processor 250 in accordance with the present invention. The stream processor 200 includes MUX logic 750 which performs conventional multiplexing operations in accordance with recognized standards such as MPEG2 to generate the combined multimedia stream 224. Combined multimedia stream 224 is preferably a program or transport stream as specified in MPEG2. The MUX logic 750 accesses the unified memory module 204 through data line 240 to retrieve the data and the instructions to perform on the data. After performing the required operations, the data 224 is temporarily written back to memory 204, for later transfer to the communications device 112 or other recipient of the Program or Transport Stream 224.

The stream processor 200 also comprises a data rate analyzer 700 which analyzes the data rate of the combined multimedia stream 224 to generate data rate value 710. The data rate is analyzed by computing the number of bits transmitted over a given period of time. The use of the actual data rate of the combined multimedia stream 224 provides a very accurate determination of whether and what adjustments should be made to the encoders 208 to maintain the optimal data rate of the system 120. In one embodiment, a second data rate analyzer 724 in the multimedia processor 250 analyzes the adjusted elementary multimedia streams 216, 218 to determine the data rates 706, 708 by dividing the number of macroblocks, frames, and groups of frames stored in the memory by the number of bits used in the macroblocks, frames, and groups of frames. The data rate 706, 708 of an elementary multimedia video stream is determined by analyzing the number of bits allocated up to a previous macroblock which has been sent. For an audio elementary video stream, the bit rate is measured per frame. However, one of ordinary skill in the art is aware of multiple methods for determining a data rate of an elementary multimedia stream 316 in accordance with the present invention. In a preferred embodiment, a data rate 706, 708 is computed for every four or five frames, and the number of bits in a macroblock, frame, or group of frames is used to determine the data rate 706, 708. The number of bits in a macroblock is determined by the quantization number (Q) as is known in conventional MPEG techniques. In one embodiment, the data rate analysis is performed by the encoders 208. In an alternate embodiment, the adjusted elementary multimedia streams 216, 218 are also analyzed by the stream processor 200 to generate actual data rate values 706, 708.

The actual data rate 710 of the system 220 is transmitted to the multimedia processor 250 and compared to a target data rate 226 of the system 120 by a data rate comparator 716. The target data rate 226 of the system 120 is transmitted to the integrated multimedia encoding system 120 from a user or other source to dictate the optimal or maximum throughput of the system 120. The target data rate 226 is preferably adjustable as the system's needs and capabilities change and is input to either the multimedia processor 250 or the stream processor 200, for transmittal to the data rate comparator 716. The data rate comparator 716 generates a rate recommendation control signal 734 to indicate whether the system 120 is operating below, at, or above the maximum or target throughput 226.

The data rates 706, 708, and the control signal 734 are then transmitted to a data rate optimizer 704 in the multimedia processor 250. The data rate optimizer 704 generates data rate feedback signals 212, 214 to ensure that the actual data rate 710 of the system 120 approximates the target data rate 226 of the system 120. Responsive to the rate recommendation control signal 734 indicating that the system throughput 710 is less than the target rate 226, the data rate optimizer 704 generates rate control or data rate feedback signals 212, 214 indicating that one or both encoders 208 should increase their data rates, if possible. As described above, this is accomplished by disabling existing delays, increasing the rate at which data is fed into the encoders 208, or increasing the number of bits per macroblock, frame, or group of frames. If the encoders 208 are already generating data at their maximum capabilities, then the system's throughput will remain below optimal until data is transmitted to the encoders 208 at a faster rate. In an embodiment in which multimedia processor 250 controls the rate at which data is fed to the encoders 208, the processor 250 will adjust the rate at which data is input to the encoders 208 to increase the system throughput.

If the rate recommendation control signal 734 indicates that the system throughput 710 is above the target rate 226, the data rate optimizer 704 generates rate control or data rate feedback signals 212, 214 indicating that one or both encoders 208 should decrease their data rates. As described above, this is accomplished by inserting delays, decreasing the rate at which data is fed into the encoders 208, or decreasing the number of bits per macroblock, frame, or group of frames. In one embodiment, an estimation engine within multimedia processor 250 determines whether an adjustment to one stream will raise the system throughput 710 to equal the target rate 226. If the adjustment does not suffice to cause the system throughput 710 to equal the target rate 226, then the data rates of the other streams are increased until the estimation engine determines that the estimated data rate equals the target rate 226, and then data rate feedback signals 212, 214 representing the final values are sent to the encoders 208. The data rates of the streams may be adjusted in any order without affecting the efficacy of the present invention. In an alternate embodiment, the data rates of the adjusted elementary multimedia streams 216, 218 are adjusted incrementally using loop feed back principles until the output data rate 710 equals the target rate 226. In a further embodiment, the multimedia processor 250 instructs the stream processor 200 to stuff bits into the stream 224 using a STUFF command to adjust the data rate of the output stream 224 to the optimal or target rate. The above components 700, 704, 716, 724 may be implemented as ASICs designed for the specific tasks described above as a part of the stream processor 200, or may be implemented as modules designed to run by the multimedia processor 250. Although the above embodiment has been described using only three streams 216, 218, 220, the multimedia processor 250 is capable of analyzing and adjusting for any number of different streams of data required to be processed through the system 120.

Figure 8:
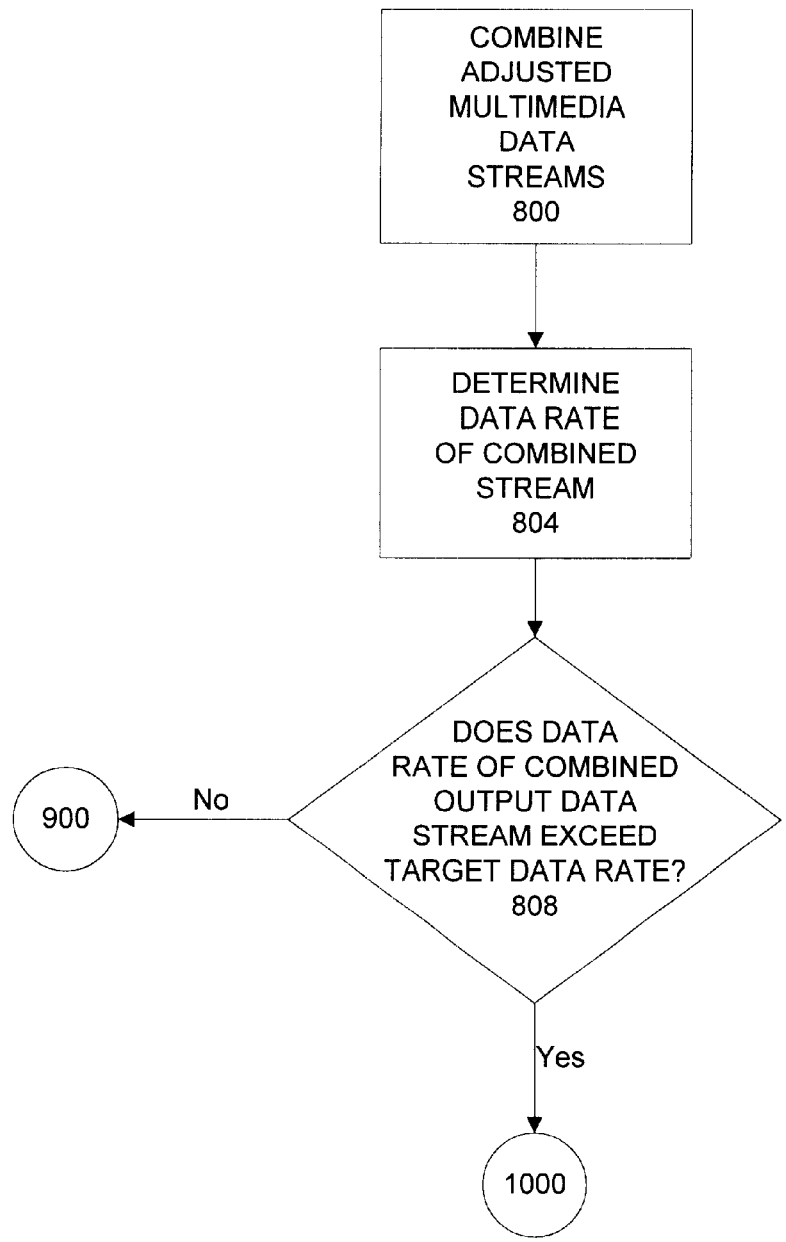
FIG. 8 is a flow chart illustrating a method of optimizing bit rates in a multimedia encoding system in accordance with the present invention.
Figure 9:
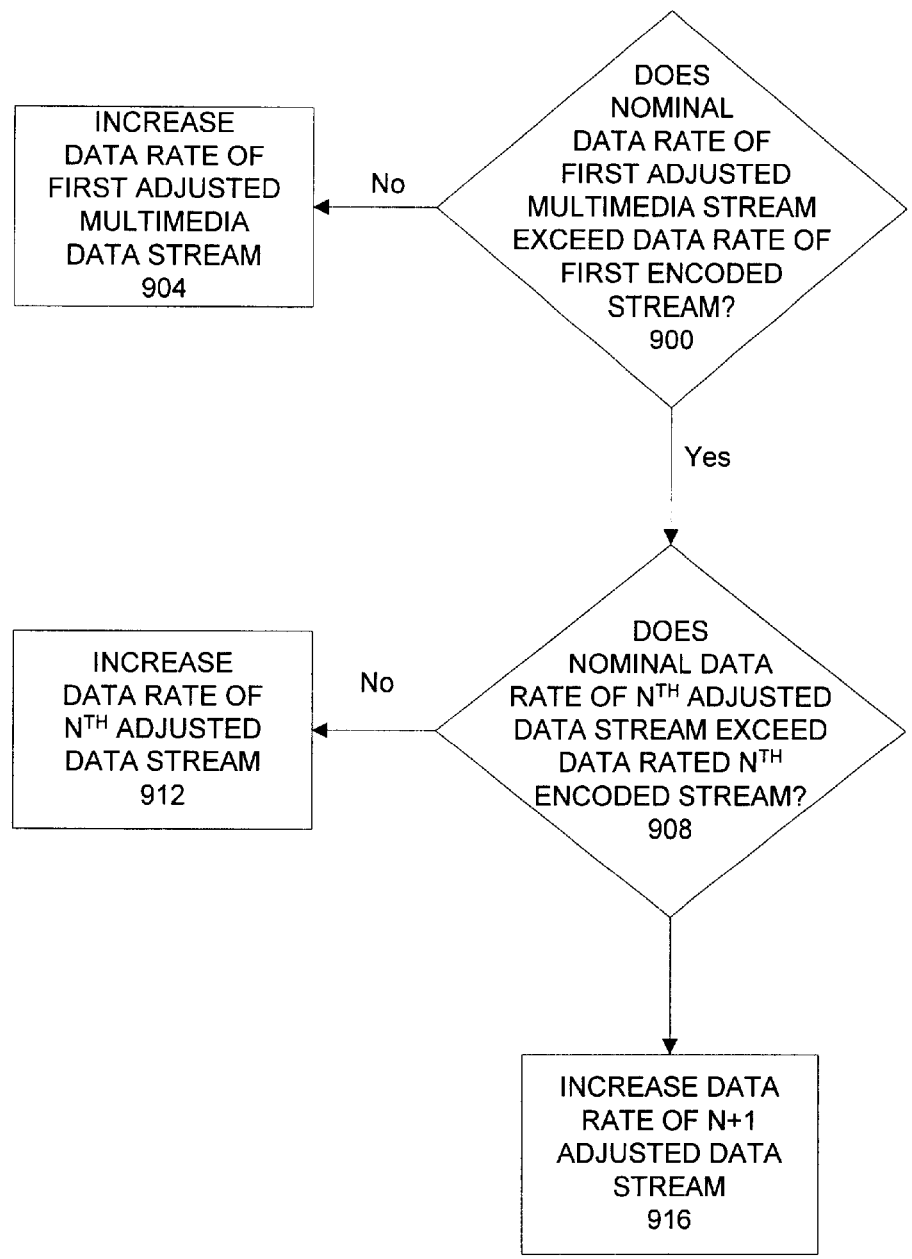
FIG. 9 is a flow chart further illustrating the method of FIG. 8.

FIG. 8 is a flow chart illustrating a method of optimizing bit rates in a multimedia encoding system 120 in accordance with the present invention. First, the adjusted elementary multimedia streams 216, 218 are combined 800 together into an combined multimedia stream 224. Next, the data rate 710 of the combined multimedia stream 224 is determined 804. The system determines 808 whether the data rate 710 of the combined multimedia stream 224 exceeds the target data rate 226. If it does not, the method as described in FIG. 9 is performed. If it does, the method as described in FIG. 10 is performed.

Referring to FIG. 9, the system determines 900 whether a nominal data rate of the first adjusted elementary multimedia stream 216 exceeds the current data rate 708 of the first adjusted elementary multimedia stream 216. The nominal data rate is used in this embodiment to specify a target data rate for each adjusted elementary multimedia stream 216, 218. The target rate is chosen by a user or other source to specify a maximum data rate for the stream. If the nominal data rate of the first adjusted elementary multimedia stream 216 stream exceeds its actual data rate 708, the data rate of the first adjusted elementary multimedia stream 216 is increased 904 to the nominal rate. If the nominal data rate does not exceed the actual rate 708, the system determines 908 whether the next streams' nominal data rate exceeds its actual data rate. If it does, the data rate of the next stream is increased 912. This process continues until all streams which are capable of having their data rates adjusted have been adjusted to their nominal rate.

Figure 10:
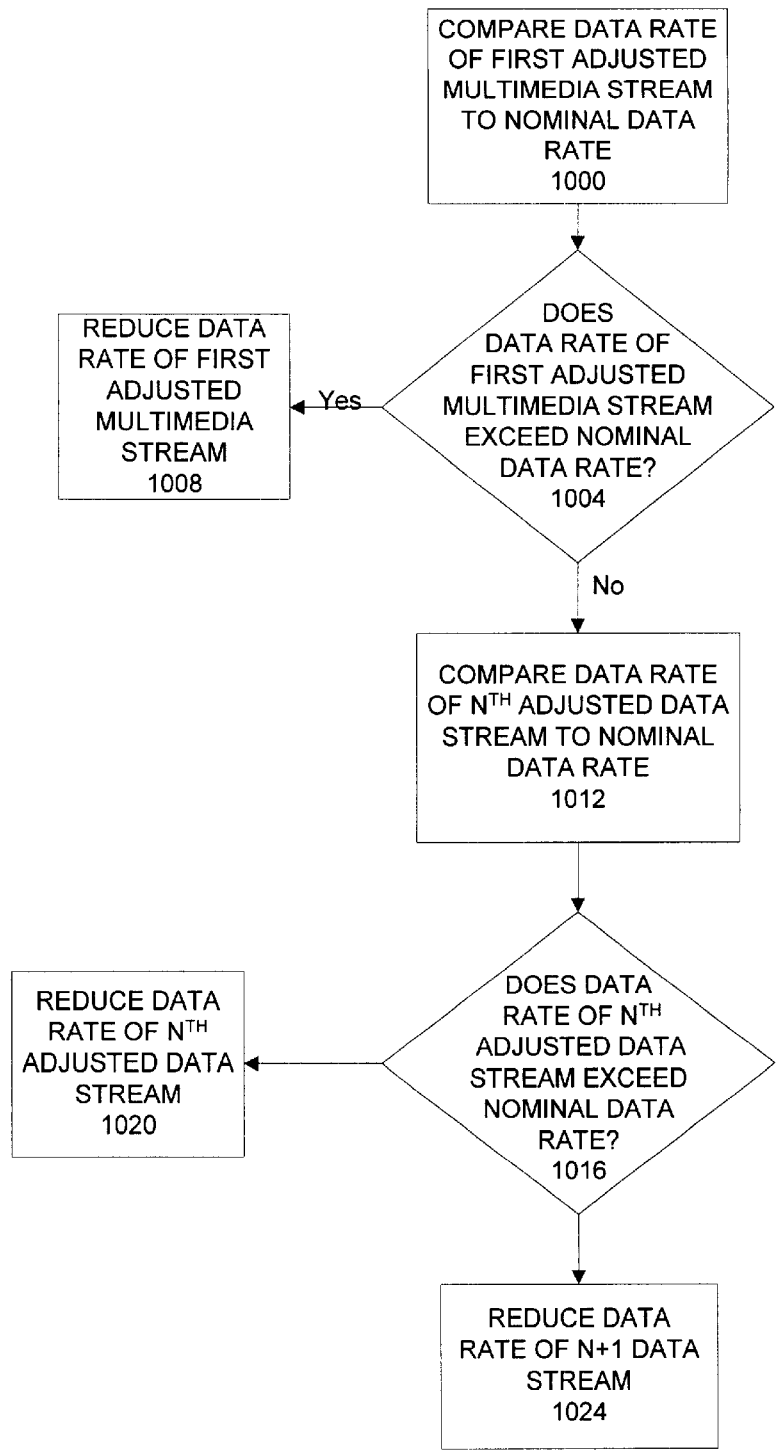
FIG. 10 is a flow chart further illustrating the method of FIG. 8.

FIG. 10 illustrates the methodology when the actual data rate 710 exceeds the target data rate 226. This can occur due to inherent skew between the clock and data cycles. Although the amount of the overshoot may be small, if the overshoot is allowed to accumulate, the error may be significant. The data rate 708 of the first adjusted elementary multimedia stream 216 is compared 1000 to its nominal data rate. If the system determines 1004 that the data rate exceeds the nominal data rate, the data rate of the first adjusted elementary multimedia stream 216 is reduced 1008. As described above, the rates are reduced by either adding a delay or decreasing the number of bits assigned to a macroblock, frame, or group of frames. If the data rate of the first adjusted elementary multimedia stream 216 exceeds the nominal rate, the next adjusted data stream is compared 1012 to its nominal rate. If the data rate of the next or Nth adjusted data stream exceeds its nominal data rate, the data rate of the Nth stream is reduced 1020. Otherwise, the data rate of the last adjusted data stream is reduced 1024.

Figure 11:
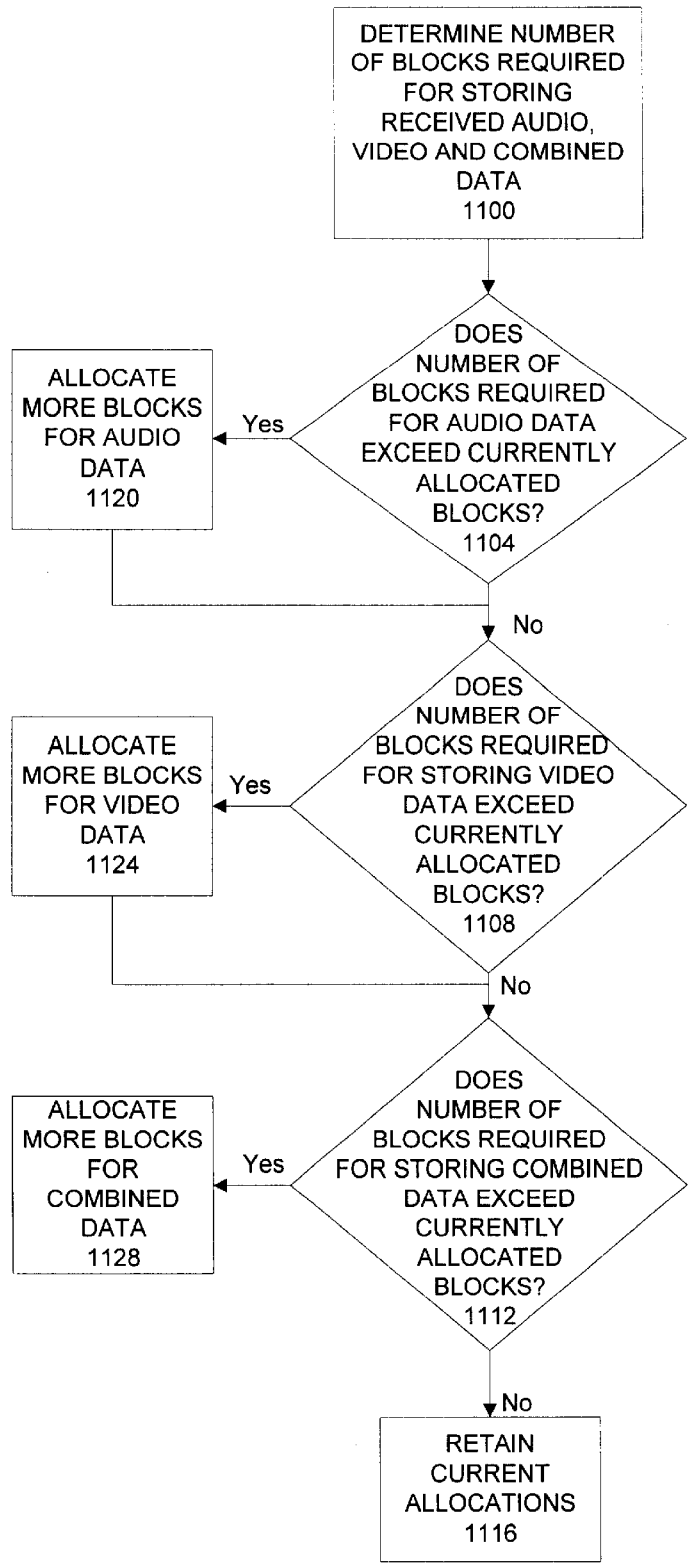
FIG. 11 is a flow chart illustrating a method of storing data in a unified memory module in accordance with the present invention.

FIG. 11 is a flow chart illustrating a method of storing data in a unified memory module 204 in accordance with the present invention. First, a number of blocks required for storing received audio, video, and combined data is determined 1100. Next, the system determines 1104 whether the number of blocks required for storing audio data exceeds the number of currently allocated blocks in unified memory module 204. If it does, more blocks in the unified memory module 204 are allocated 1120 to store audio data. If not, the system determines 1108 whether the number of blocks required for storing video data exceeds the number of currently allocated blocks. If it does, more blocks are allocated 1124 for storing video data. Then, the system determines 1112 whether the number of blocks required for storing the combined output multimedia data 224 exceeds the number of currently allocated blocks. If it does, more blocks are allocated 1128 for storing the combined data. If the current allocations are sufficient, the system retains 1116 the current allocations. In an embodiment in which other data streams are stored in unified memory module 204, blocks are allocated in a similar manner.

Figure 12:
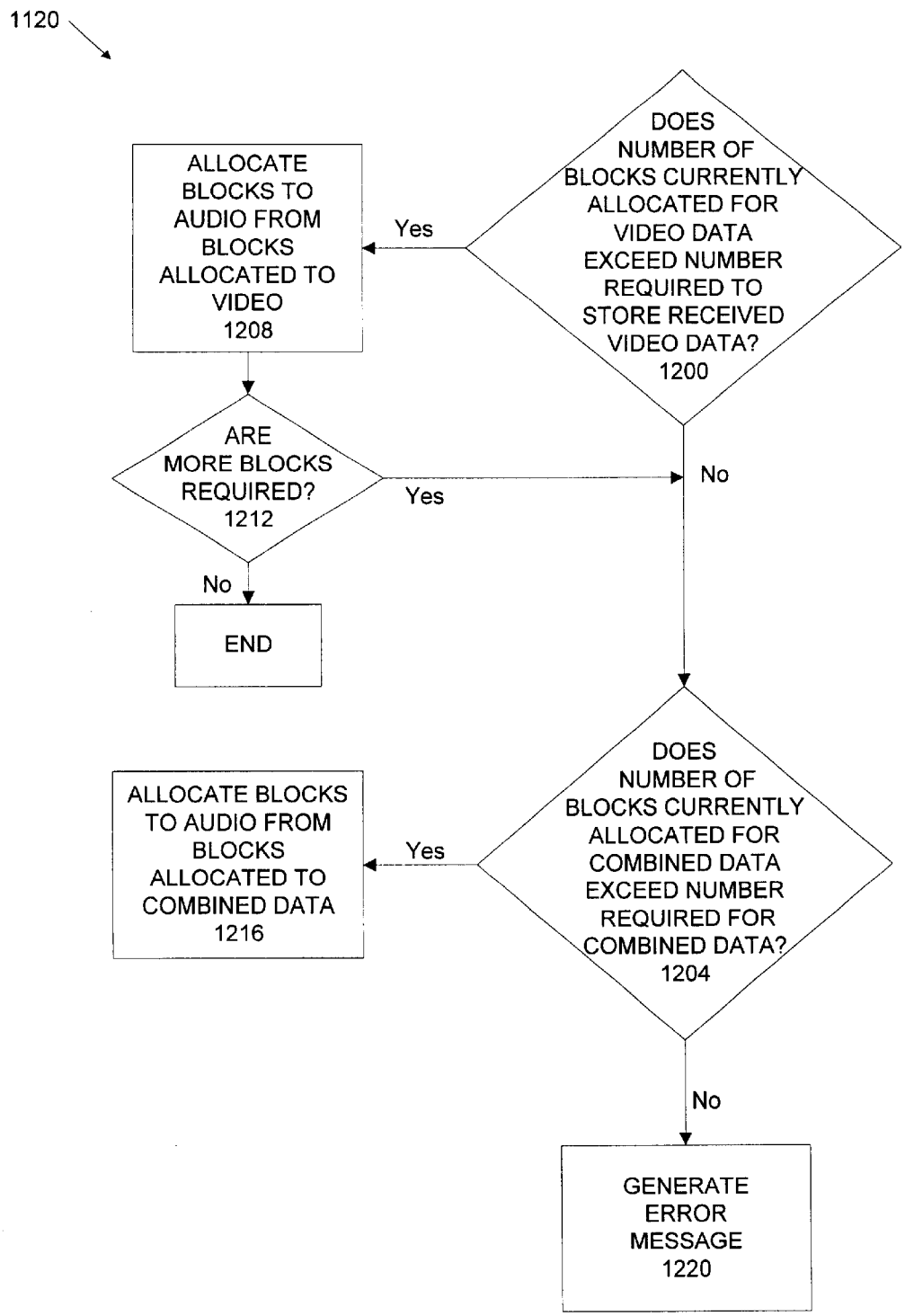
FIG. 12 is a flow chart illustrating a method of allocating blocks in accordance with the present invention.

FIG. 12 is a flow chart illustrating a method of allocating blocks in accordance with the present invention. FIG. 12 illustrates a method for allocating audio blocks 1120, but is applicable for allocating any blocks of memory to a data stream in accordance with the present invention. First, the system determines 1200 whether the number of blocks currently allocated for storing video data exceeds the number of currently required for storing video data. If it does, blocks which are currently allocated to store video are allocated 1208 to store audio data. Then, the system determines 1212 whether more blocks are required for storing the audio data. If there are more blocks required, the system determines 1204 whether the number of currently allocated blocks for the combined output multimedia data 224 exceeds the number of blocks required for storing the combined output multimedia data 224. If it does, then blocks currently allocated to store the combined data are allocated 1216 to store the audio data. If no blocks are available to be allocated, an error message is generated. In an embodiment with other data streams, the other data streams are analyzed in a similar manner, where current allocations are compared with current requirements to determine whether more blocks are required or whether existing blocks can be reallocated.

While the present invention has been described with reference to certain preferred embodiments, those skilled in the art will recognize that various modifications may be provided. These and other variations upon and modifications to the preferred embodiments are provided for by the present invention.

What is claimed is:

1. In a system for combining input multimedia data streams to form an output multimedia data stream, an apparatus for adjusting rates of the input multimedia data streams comprising:
    a data rate analyzer, coupled to the output multimedia data stream, for determining the data rate of the output multimedia data stream; and
    a multimedia processor, coupled to the data rate analyzer, for comparing the determined output multimedia data stream data rate to a target output data stream data rate, and generating rate control signals for adjusting the data rates of the input multimedia data streams responsive to the comparison.

2. The apparatus of claim 1 wherein the multimedia processor further comprises:
    a rate comparator, having a first input for receiving a target output data stream data rate and a second input coupled to the output of the data rate analyzer, for generating a rate recommendation signal;
    a data rate optimizer, having a control input coupled to the rate comparator for receiving the rate recommendation signal, and generating rate control signals to be used by encoders to alter the data rates of the input multimedia data streams responsive to the rate recommendation signal.

3. The apparatus of claim 2 wherein the multimedia processor further comprises:
    a data rate analyzer, having inputs for receiving compressed multimedia data of the data streams and outputs coupled to the data rate optimizer, the outputs defining a data rate for compressed multimedia data of the data streams; and
    wherein the data rate optimizer analyzes the data rates of the compressed multimedia streams and the rate recommendation signal to generate rate control signals.

4. The apparatus of claim 1 wherein the input multimedia data stream is a video elementary stream.

5. The apparatus of claim 1 wherein the output multimedia data stream is a program stream.

6. The apparatus of claim 1 wherein the output multimedia data stream is a transport stream.

7. In a device for providing compression to input multimedia data streams, combining the compressed multimedia data streams into an output combined multimedia data stream, and storing compressed multimedia data streams and output combined multimedia data streams, an apparatus comprising:
    at least one multimedia data encoder, comprising:
        a compression engine, for compressing a multimedia data stream and providing a compressed multimedia data stream output; and
        a data rate adjuster, coupled to the output of the compression engine, for adjusting the data rate of the compressed multimedia data stream output responsive to a rate control signal generated by a multimedia stream control unit;
    a unified memory module, comprising:
        a plurality of reallocatable multimedia data buffers;
    a memory allocator, coupled to the multimedia data stream buffers, for determining storage requirements of the compressed multimedia data stream and the output multimedia data stream as the streams are received, and allocating buffers responsive to the determined storage requirements;
    the multimedia stream control unit being coupled to the unified memory module and the multimedia data encoder, and comprising:
        a data rate analyzer, coupled to the output combined multimedia data stream, for determining the data rate of the output combined multimedia data streams;
    and a data rate feedback adjuster, coupled to the data rate analyzer and the at least one multimedia data encoder, for comparing the determined output combined multimedia data stream data rate to the target output combined data stream data rate, generating rate control signals for adjusting the data rates of the compressed multimedia data streams responsive to the comparison, and transmitting the rate control signals to the at least one multimedia data encoder.

8. The apparatus of claim 7 wherein the buffers comprise an instruction part and a data part, and the instruction part comprises at least one of a set of instructions for directing the multimedia stream control unit to perform data manipulations on information in the data part.

9. The apparatus of claim 8 wherein the instruction set includes program control instructions, data access instructions and data processing instructions.

10. The apparatus of claim 8 wherein the buffers are organized using link lists, and the buffers are accessed in accordance with the link lists.

11. The apparatus of claim 7 wherein there are two multimedia data encoders, a first encoder for encoding video data and a second encoder for encoding audio data.

12. The apparatus of claim 7 wherein the multimedia stream control unit comprises a target data rate input for receiving a target output combined multimedia data stream data rate.

13. A method for generating a combined multimedia data stream output having a data rate within a tolerance of a target data rate, in a device having multimedia encoders for generating encoded data streams and a data stream multiplexer, comprising the steps of:
    combining the encoded data streams to form a single output data stream;

determining the data rate of the combined output data stream;

comparing the determined data rate to a target data rate;

responsive to the target data rate exceeding the determined data rate, adjusting the data rates of the encoded data streams until the combined output data stream data rate is within a tolerance of the target data rate; and responsive to the determined data rate exceeding the target data rate, adjusting the data rates of the encoded data streams until the combined output data stream data rate is within a tolerance of the target data rate.

14. The method of claim 13 further comprising the step of:

monitoring the data rate of the encoded data streams; wherein the responsive to the determined data rate exceeding the target data rate, adjusting the data rates step further comprises comparing the monitored data rates of the encoded data streams to nominal data rates for the encoded data streams;

responsive to a data rate of an encoded data stream exceeding its nominal data rate, reducing the data rate of the encoded data stream; and wherein the responsive to the target data rate exceeding the determined data rate, adjusting the data rates step further comprises:

comparing the monitored data rates of the encoded data streams to nominal data rates for the encoded data streams;

responsive to a nominal data rate of an encoded data stream exceeding the data rate of the encoded data stream, increasing the data rate of the encoded data stream.

* * * * *